United States Patent [19]

Pazdej

[11] 4,332,777

[45] Jun. 1, 1982

[54] HYDROMETALLURGICAL TREATMENT OF METALLURGICAL DUST

[75] Inventor: Richard Pazdej, Maizieres-les-Metz, France

[73] Assignee: Institut de Recherches de la Siderurgie Francaise, Saint-Germain-en-Laye, France

[21] Appl. No.: 157,645

[22] Filed: Jun. 6, 1980

[30] Foreign Application Priority Data

Jun. 15, 1979 [FR] France .................. 79 15623

[51] Int. Cl.³ .............. C01G 9/06; C01G 21/20
[52] U.S. Cl. ............................. 423/98; 423/109
[58] Field of Search ............. 423/95, 98, 106, 109

[56] References Cited

U.S. PATENT DOCUMENTS

| | | | |
|---|---|---|---|
| 2,264,337 | 12/1941 | Seguire | 423/109 |
| 3,375,069 | 3/1968 | Duval | 423/106 |
| 3,676,107 | 7/1972 | Barnard | 423/95 |
| 4,107,265 | 8/1978 | Ropenack | 423/109 |
| 4,124,462 | 11/1978 | Reinhardt | 423/109 |

FOREIGN PATENT DOCUMENTS 49198 4/1965 Poland ................. 423/109

*Primary Examiner*—Brian E. Hearn
*Attorney, Agent, or Firm*—Michael J. Striker

[57] ABSTRACT

Process and apparatus for hydrometallurgical treatment of metallurgical dust by acid leaching followed by a solid-liquid separation. The invention is characterized in that the leaching phase is effected by moderate acid attack (pH at the end of the reaction about 4 or 5) and in which a supplementary solid-solid separation stage is provided, before the solid-liquid separation or after. The invention is applicable to all dusts resulting from treatment of metals, notably ironworking dusts, and particularly those formed in blast furnaces so as to permit the separation and recovery of useful elements contained therein, such as iron, zinc and lead.

5 Claims, 2 Drawing Figures

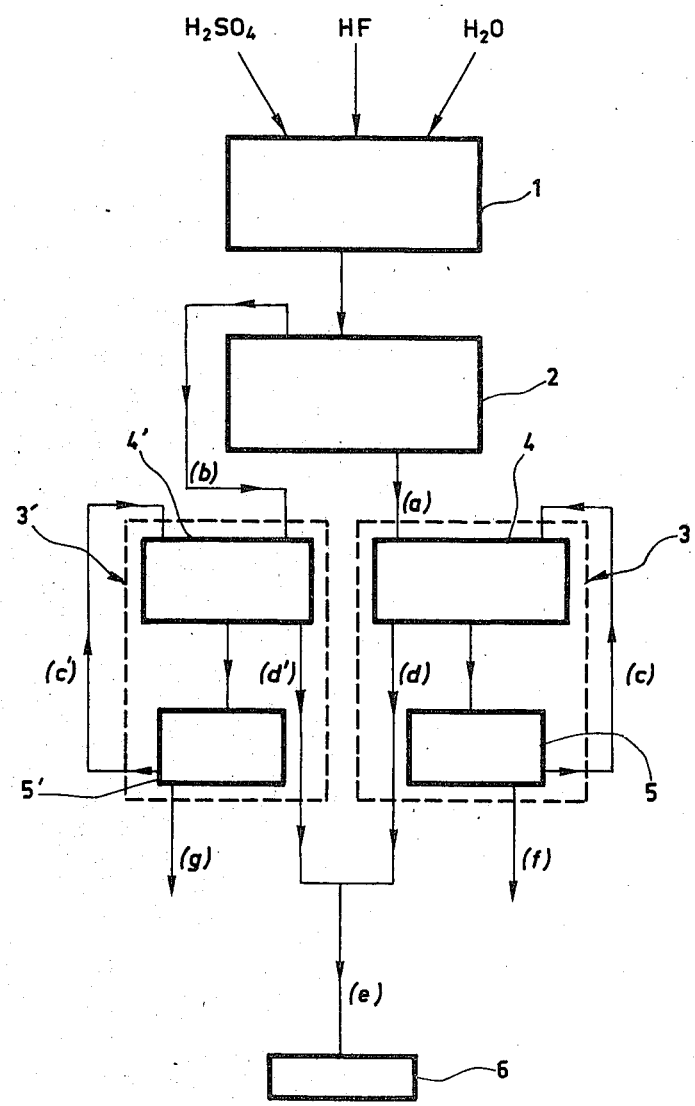
FIG_1_

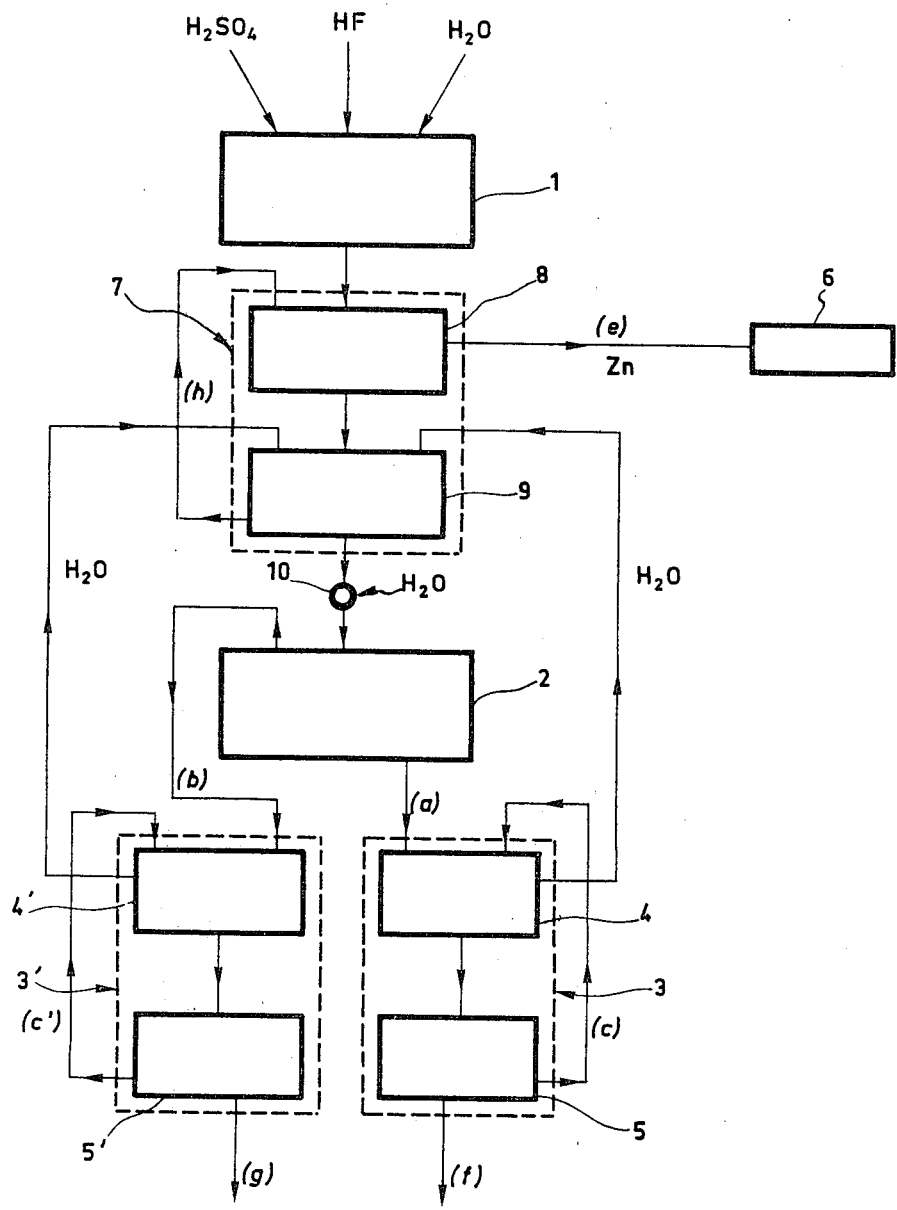
FIG_2_

HYDROMETALLURGICAL TREATMENT OF METALLURGICAL DUST

BACKGROUND OF THE INVENTION

The present invention concerns the hydrometallurgical treatment of metallurgical dust, by leaching, with a view toward separation and recovery of the useful elements contained therein, namely zinc, lead or iron.

The hydrometallurgical treatment of metallurgical dust and, more particularly dust from iron working, by leaching—generally with sulfuric acid—has until now met with two types of difficulties.

The first is that the placing in solution of a part of the iron leads to an increased consumption of the acid, and yields, after solid-liquid separation, a filtrate where the zinc, in the presence of the more electronegative iron, presents problems of electrolytical recovery. The second is due to the fact that the lead sulfate during the acid attack is insoluble and for this reason is found in the solid load mixed with iron, after solid-liquid separation and then poses a problem of reemployment, notably in iron working.

SUMMARY OF THE INVENTION

The object of the present invention is to propose a solution to these difficulties.

To that end, the invention has as an object a process of hydrometallurgical treatment of metallurgical dust by leaching in an acid solvent, generally sulfuric acid, followed by a solid-liquid separation. The leaching takes place by attack of a moderate acid, that is to say that the pH of the solution at the end of the reaction is preferably about 4 or 5, and on the obtained solid fraction a supplementary solid-solid separation stage is effected, for example by granulometric classification or by selective flocculation-decantation.

This solid-solid separation stage can be located according to two distinct variations of the invention, either in an intermediate fashion between the leaching phase and the liquid-solid separation phase, or after the liquid-solid separation, in which case the latter is first completed by a repulping, for example with water, of the solid fraction.

The invention equally has as object an apparatus for implementing the process, comprising in series a lixiviator—or leaching tank—, a solid-liquid separator and a solid-solid separator.

Conforming to the two possible embodiments of the apparatus, appropriate respectively for the two variations in the implementation of the process, the arrangement of elements constituting the apparatus, according to the order of successive operations in treating the dust, is present in the sequence: leaching tank → solid-solid separator → solid-liquid separator, or the sequence: leaching tank → solid-liquid separator → solid-solid separator.

As it is understood, the invention is characterized by the following fundamental characteristics:

execution of a moderate acid attack on the dust, which permits the transformation into salts of the zinc oxides and lead oxides, in this way eventually reducing these elements to their metallic form, and this without appreciably affecting the iron. To this end, the pH of the solution at the end of the reaction must not be less than about 4 or 5. In principle, all of the mineral acids are suitable insofar as they provide the placing in solution of zinc but not of lead, with the particular exclusion of nitric acid. It is known in the realm of zinc hydrometallurgy that sulfuric acid is prescribed. Accordingly, in the present invention the acid used is preferably sulfuric acid and will be used in this connection absent contrary indications.

to execute afterwards on the obtained product a solid-solid separation, or, expressed differently, an imperfect solid-liquid separation. In fact, if the solid-liquid separation of the product resulting from the acid attack is effected in a perfect manner (by clarifier or filter), the lead sulfate remains unattacked with the solid. According to the invention, an imperfect separation extracts the lead sulfate from the solid portion of the initial mixture in two phases: a thick pulpy phase constituted essentially by the solid not attacked and a liquid phase containing the sulfate in suspension. This solid (pulp)-solid (in suspension) separation can be effected by ordinary industrial techniques, such as selective flocculation which procures a preferential decantation of one species from the other. Meanwhile, if the species to be separated are already physically well distinguished in the liquid, as as the case of lead sulfate which is presented in a very broken up form, or at least appreciably more divided than the non-attack solid, a wet granulometric separation technique may be preferably called for, for example by means of a regular hydrocyclone, or any other appropriate technique for such function (hydrosizer, sieve, etc.). It is seen that according to one variation of the invention, the solid-solid separation may be effected without using the initial mixture of acid solution and solid, but on a reconditioned product obtained after an intermediate stage of perfect separation of the initial mixture and with treatment of the solid residue by water provided for making a pulp suitable for undergoing wet classification.

The respective advantages and disadvantages of the process variations will be briefly set forth later. It must be mentioned preliminarily that the preceding expression used, "solid-liquid separation" (or "solid-liquid separator") is well understood to mean, in the absence of greater precision, a perfect solid-liquid separation, that is to say an operation designed to produce a clear liquid. According to current industrial practice, such an operation consists of a decantation eventually followed by a filtration of the decanted pulp and completed when necessary by a recirculation of the filtrate to the decantation stage of the operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

Two examples of implementation of the invention will now be described in greater detail, referring to the appended drawings in which:

FIG. 1 is a diagram of the principle of treating iron-working blast furnace sludge according to the variation in which the solid-solid separation follows directly after leaching, FIG. 2 is also a diagram of the principle of treating blast furnace sludge but according to the variation in which the solid-solid separation follows an intermediate solid-liquid separation stage.

DESCRIPTION OF THE PREFERRED EMBODIMENTS

In the two FIGS. the same phases or stages of treatment are designated by identical reference numerals. The diagrams are executed in conformity with the chronological order of treatment operations.

As seen in FIG. 1, the blast furnace sludge recovered following removal of dust from the fumes at the mouth of the blast furnace are treated with sulfuric acid in an initial leaching phase, reference numeral 1. Provision of water may be necessary for dilution of the acid, notably when acid of a high concentration is used, or when pure acid is used (36 N). According to the invention, the acid attack must be "moderate", that is to say that the pH of the solution at the end of the reaction must not be less than about 4 or 5.

Control of the pH at the end of the reaction is done in an ordinary manner with a pH meter or, in a more rudimentary fashion, by means of "litmus paper", or by any other means.

Under these conditions, the iron and its compounds contained in the sludge are not attacked in practice, and only the zinc and the lead, present in oxidized form, are changed into sulfate.

The result of the leaching 1 is then a solid-liquid mixture, the solid being constituted essentially by iron (and its compounds) and by insoluble lead sulfate, formed in the course of the reaction, and present in a very divided form compared with the iron, the liquid being an acid solution of zinc sulfate.

This mixture is then subject to a solid-solid separation, executed in 2 by granulometric classification, designed to separate the small particles of lead sulfate from the much larger iron-bearing fragments. This classification operation can easily be realized by a standard hydrocyclone in which the threshold for granulometric separation is well regulated. Two types of solid-liquid mixture are collected coming out of the classification stage: the "under-layer" constituting an iron-bearing pulp containing a slight amount of the initial zinc sulfate acid solution, and a "top layer" composed of a suspension of lead sulfate particles in the zinc sulfate solution which is found here almost completely.

The under-layer, reference letter (a) in the FIGS., and the top layer, reference (b), are then each treated in a solid-liquid separation phase represented by dashed lines and designated respectively 3 and 3'. These phases 3 and 3' are identical to each other and include, in typical fashion, two successive treatment stages: a decantation stage 4 (respectively 4'), followed by a filtration stage 5 (respectively 5') with recycling of the filtrate, reference (c) and (c'), into the decantation stage. Coming out of the two decantation stages 4 and 4' is obtained a fraction of the initial zinc sulfate acid solution which is reunited into a single solution (e). Besides this is collected, coming out of the filtration stage 5, an iron-bearing cake (f) and coming out of filtration stage 5' a lead sulfate cake (g).

The zinc solution (e) can have many intended purposes, for example to assist in the manufacture of sulfates destined for agricultural use, or oxides for paints, or, as shown in the drawing, it can be treated in an electrolysis tank indicated schematically by the numeral 6 for the recovery of zinc in metallic form after purification.

The lead recovered in the cake (g) can find a market notably in non-ferrous metallurgy.

Finally, the iron contained in the cake (f) can be recycled for ironworking.

The diagram of treatment represented by FIG. 2 is distinguished from the preceding by the presence of a solid-liquid separation phase 7 intermediate between the leaching 1 and the granulometric classification 2. This phase 7 is composed, in standard fashion, as described above, of a decantation stage designated by numeral 8, followed by a filtration stage 9 in which the filtrate (h) is recycled in 8.

This variation in the process according to the present invention compared to that previously described, has the following essential particularities: the acid solution of zinc sulfate (e) is extracted from the decantation stage 8, much sooner in the course of the treatment process, before the granulometric classification operation 2. This has the notable consequences:

on the one hand, it is necessary to repulp the filtration cake issuing from stage 9 before proceeding to separate the iron-bearing fragments from the lead sulfate particles in the granulometric classification stage 2. This repulping, symbolized by numeral 10 in the FIG. can be performed by any known method, for example by addition of water;

on the other hand, the solid-liquid separation stages 3 and 3' below the granulometric classification 2 are no longer absolutely necessary in order to obtain the results sought by the present invention. They are presented only as optional features depending upon whether or not one wishes to recover the iron (and the lead) in aqueous suspension. In that respect, the possible solid-liquid separation operation 3—that is to say, treatment of the iron-bearing "under-layer" (a)—can be limited to the first decantation stage 4 since the aqueous pulp thus collected can advantageously be recycled as an agglomeration of minerals without the risk of pollution with the zinc or the lead.

The option of one or the other variation which have been described, is best understood to be left to the free choice of the user, who will choose as a function of his own wishes or requirements and in relation to consideration of their respective advantages, which can be briefly remembered in the following manner:

Variation according to the functional diagram of FIG. 1

The attack with sulfuric acid, operating in the initial moderate leaching phase 1 being exothermic, the requirements for bringing about the granulometric classification 2 which follows immediately are from that time, as known, improved.

The decantation operations can be accelerated by addition of a flocculant which promotes agglomeration among the particles, insofar as it is not harmful to the preceding granulometric classification. This advantage disappears when the solid-liquid separation intervenes between the leaching phase and the granulometric classification.

Variation according to the functional diagram of FIG. 2

The aqueous repulping 10 following intermediate stage 7 (solid-liquid separation) allows for adjusting the proportion of solid to an optimum value for the later granulometric classification operation. Working conditions may thus be optimized, notably for the hydrocyclone.

In a more general manner, it is found, at the level of the granulometric classification 2, in a situation totally independent from the preceding, that a greatly versatile influence is presented, considering the zinc sulfate acid solution previously extracted in that there is no longer any risk, for example, in reducing the concentration of zinc at the time of the addition of repulping water.

It is to be noted that the invention is not intended to be limited by these described examples.

With respect to the products capable of being treated, the invention can be applied generally to all ironworking dusts, and more generally to all of metallurgy, insofar as they contain useful elements such as zinc, lead and iron—whatever may be their hygroscopic stage (dry dust or dust already wet in the form of aqueous pulp), or their origin (dust from ironworking blast furnaces, from furnaces for the conversion of pig iron, from electrical furnaces, etc. . . . ) or from any other apparatus for treating metals both ferrous and non-ferrous.

However, in the realm of ironworking, the invention is preferably applied to dust from blast furnaces. In fact, in the dust from steel works, the iron and the zinc can be united in ferrites ($ZnO-Fe_2O_3$). The complete dissolution of zinc involves breaking the ferritic structure, which is obtained generally by attack with a strong acid, which is responsible for the passage of iron into solution.

On the contrary, in the case of dust from blast furnaces, zinc is not linked to the iron and its present essentially in oxidized form ($ZnO$). The complete dissolution of the zinc, is possible then of being executed by moderate acid attack, presenting thus a selective character and not perceptively affecting the iron.

Trial measurements have been executed from blast furnace sludge containing by weight 14% by iron, 15% zinc and 4% lead and treated according to the first variation in the process according to the invention.

The slag was at first treated with sulfuric acid in the proportion 37 g of $H_2SO_4$ (pure, 36 N) diluted with 0.5 l. of water per 100 g of slag being treated. The leaching treatment lasted 25 minutes, until a pH of 4.5 was obtained.

The later granulometric classification was performed with a hydrocyclone in which the cutoff was regulated to about 20 μm.

The results obtained are indicated in the table below.

The first line concerns the initial product to be treated.

The second line concerns the residue from the attack at the end of the leaching phase. The two last lines concern the product after granulometric classification and relate respectively to the granulometric fractions greater than 20 μm "under-layer" (a) and smaller "top layer" (b).

The first column indicates the quantities by weight remaining from 100 g of initial product, the three columns following contain the analytical results expressed in percentages by weight. The three last columns display the relative distribution of elements analyzed in the different stages of the process with respect to a reference value equal to 100.

|  | Weight (in g.) | Analysis (in %) | | | Distribution | | |
| --- | --- | --- | --- | --- | --- | --- | --- |
|  |  | Fe | Pb | Zn | Fe | Pb | Zn |
| Initial Product | 100 | 14 | 4 | 15 | 100 | 100 | 100 |
| Leaching residue | 54 | 25 | 7 | 1 | 98 | 100 | 5 |
| Under-layer (a) | 40 | 29 | 0.7 | 0.3 | 84 | 7 | 1 |
| Top layer (b) | 14 | 14 | 23 | 4 | 14 | 93 | 4 |

It is easily accepted from the calculations, that the ratio of recovery was 93% for the lead, 84% for the iron and 95% for the zinc—which indicates that almost all of the initial zinc is passed into solution—, but that only 2% of the initial iron underwent the same fate.

According to the case, complementary arrangements should be well understood and appreciated, which will assert themselves naturally to the skilled man in the art without meeting difficulties considering they fall completely within the scope of ordinary competence.

When the dusts to be treated contain several elements soluble under moderate acid attack, the recovery of these is performed by a separation phase, for example by selective precipitation or by controlled electrolysis with metallic deposits formed sequentially on the electrodes, or by any other appropriate technique. Similarly, when the dusts contain several elements (or compounds) which are insoluble, attacked or not by acid, it is desirable that the solid fraction be introduced into a granulometric stage in relation with the elements desired to be separately recovered. This granulometric stage can be natural, or provoked by acid attack as is the case for iron and lead, or by any other adequate means. The subsequent granulometric classification is then effected according to several successive operations involving various granulometric thresholds.

Any complementary dispositions can be simplified if desired, that is not a complete separation of all the elements, but only a partial separation yielding several predetermined elements, the others for example being of slight economic interest, or of some detriment to the reutilization of the separated elements.

Such is the case with the dust from blast furnaces in which the elements generally desired for recovery number three: zinc, iron and lead.

These provide a new economic reason for preferably applying the invention to the treatment of dust from blast furnaces.

It is to be noted finally that the dusts should be preferably in a wet state, that is to say forming a sludge, by reason of the greater concentration therein of zinc (5 to 50% by weight) and lead (1 to 10%) relative to dry dusts (1 to 2% of zinc and 0.2 to 0.5% of lead). But the process according to the invention is equally advantageous for the latter, in which slight concentrations are frequently originally present making dry dust economically unfit for treatment by other processes of recovery, the result being that they are placed in slag dumps.

In this regard, the invention is to be understood not only as a method of stabilizing ironworking byproducts, but also as a means for fighting against environmental pollution caused by ironworking factories.

It will be understood that each of the elements described above, or two or more together, may also find a useful application in other types of methods and apparatus for treating metallurgical dust differing from the type described above.

While the invention has been illustrated and described as embodied in a method and apparatus for hydrometallurgical treatment of metallurgical dust, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Process for the hydrometallurgical treatment of metallurgical dust containing useful elements such as iron, zinc and lead, in which said elements are selectively separated for recovery, comprising in order the steps of:
    (1) leaching said dust by attack of sulphuric acid solution diluted to dissolve said zinc into sulphate form and to form insoluble particles of lead sulphate without affecting said iron, thereby forming a solid fraction and a mainly liquid fraction;
    (2) performing a solid-solid separation of said solid fraction by granulometric classification to separate said iron from very fine lead sulphate particles; and
    (3) performing a solid-liquid separation composed of two identical operations in parallel to separate from said mainly liquid fraction, respectively, iron particles and lead sulphate particles.

2. Process according to claim 1, wherein said solid-liquid separation is effected by a decantation phase supplemented by a filtration phase.

3. Process according to claim 1, wherein said leaching is effected in such manner that the pH of said sulphuric acid solution at the end of the reaction is not less than 4 or 5.

4. Process according to claim 1, further comprising immediately after said step of leaching and before said step of solid-solid separation by granulometric classification, a supplementary solid-liquid separation for separating insoluble particles containing iron or lead from suspension in the acid solution of the zinc sulphate.

5. Process according to claim 4, wherein said supplementary solid-liquid separation is effected by a decantation phase supplemented by a filtration phase, and further comprising, immediately after said filtration phase of said supplementary solid-liquid separation and before said granulometric classification, repulping the solid fraction obtained from said filtration phase, for said granulometric classification.

* * * * *